United States Patent [19]

Davy

[11] 4,061,213
[45] Dec. 6, 1977

[54] BRAKE DISC ADAPTER FOR USE WITH ANTI-SKID SYSTEM

[75] Inventor: David Larry Davy, Troy, Ohio

[73] Assignee: The B. F. Goodrich Company, Akron, Ohio

[21] Appl. No.: 734,944

[22] Filed: Oct. 22, 1976

Related U.S. Application Data

[63] Continuation of Ser. No. 577,902, May 15, 1975.

[51] Int. Cl.² .............................................. B60T 8/08
[52] U.S. Cl. .......................... 188/181 R; 188/218 XL
[58] Field of Search ........ 188/181 A, 181 R, 218 XL; 310/168

[56] References Cited

U.S. PATENT DOCUMENTS

| | | | |
|---|---|---|---|
| 3,469,662 | 9/1969 | Dewar | 188/181 A |
| 3,716,121 | 2/1973 | Frigger | 188/181 R |
| 3,939,373 | 2/1976 | Roberts | 310/168 |

FOREIGN PATENT DOCUMENTS 516,281  9/1955  Canada ........................ 188/218 XL Primary Examiner—Duane A. Reger
Attorney, Agent, or Firm—Harry F. Pepper, Jr.

[57] ABSTRACT

A disc adapter for attaching rotatable discs of a disc brake system to a wheel is modified to include an exciter ring of a sensor unit of an anti-skid system used in conjunction with the braking system. The exciter ring is oriented co-axially with the wheel and contains a plurality of equally and annularly spaced ripples. Rotational movement of the exciter ring and the wheel is detected by a stationary magnetic pickup device adjacent to the exciter ring.

3 Claims, 3 Drawing Figures

BRAKE DISC ADAPTER FOR USE WITH ANTI-SKID SYSTEM

BACKGROUND OF THE INVENTION

This is a continuation of application Ser. No. 577,902, filed May 15, 1975.

The present invention relates to disc brake assemblies and more particularly to disc brake assemblies used in conjunction with anti-skid systems.

Anti-skid systems have been utilized in aircraft, railway, truck and other vehicles to improve the effectiveness of their braking systems. Many types of anti-skid systems utilize a sensing device which supplies signals to a "logic" portion of the anti-skid system which determines rotational speed and acceleration of the wheel and impending skid situations. The system further comprises modulating valves which, when activated, regulate braking fluid pressure. When a skid situation occurs or is impending, the logic portion of the system will activate the modulating valves, thus altering the braking fluid pressure. From the sensing device signals, it is possible for the system to continually monitor wheel speed deceleration and acceleration and to maintain the maximum braking pressure possible without producing a skid.

Many sensing devices include a magnetic pickup device and an annular exciter ring having surface variations such as teeth or ripples. The exciter ring is mounted to a rotatable portion of the wheel and brake assembly while the magnetic pickup device is operatively mounted adjacent to the exciter ring on a nonrotating portion of the wheel and brake assembly. An electrical pulse is generated each time a tooth or ripple of the rotating exciter ring passes the stationary pickup device. By analyzing the generated pulses, the logic portion of the anti-skid device can determine the acceleration or deceleration rate of the rotating wheel and can thereby send any corrective signals to the modulating valves.

Many vehicles having anti-skid systems also use disc brake systems which require rotating and stationary brake members. Means are utilized to secure each stationary member or stator, to a nonrotating portion of the wheel or axle and to rotatably mount each rotating member, or rotor, to a rotating portion of the wheel. The rotors are often mounted to a rotatable portion of the wheel by means of a device known as a disc adapter. The wheel thereby drives the rotor by means of the disc adapter. Typically, a disc adapter is a circumferentially annular member designed to be co-axially secured at one end to a rotatable portion of a wheel and at the other end to a rotatable brake disc or rotor.

Exciter rings have previously been located on rotatable brake discs. U.S. Pat. No. 3,469,662 discloses a combination brake disc and exciter ring with a sensor or transducer located radially outwardly from the exciter ring, the sensor thereby "reading" interruptions in a radial direction. A problem inherent with any radially sensing system is "radial run-out" of the exciter ring. This can be caused by eccentricity of the exciter ring or by an out of roundness of the exciter ring.

The radial run-out problem can be difficult to eliminate, especially when dealing with the close tolerances required between a sensor or transducer and an exciter ring. If the gap between the sensor and exciter ring is too large due to out of roundness or eccentricity of the disc, the sensor may fail to read surface variations or interruptions in the rotating exciter ring. This will cause the sensor to mistakenly indicate to the logic components of the anti-skid system that the associated wheel has locked and a skid is occurring. The logic components of the system may then release all brake pressure then being applied to that wheel, thereby unnecessarily hampering the vehicle operator's ability to apply braking forces to the vehicle.

SUMMARY OF THE INVENTION

It is an object of this invention to provide a modified disc adapter for use in disc brake assemblies with anti-skid systems.

It is a further object of this invention to provide a brake disc adapter designed to be utilized as a part of a speed sensing device of an anti-skid system.

It is a further object of this invention to provide a combination disc adapter, for use in conjunction with a disc brake assembly and exciter ring for use in an anti-skid system for the control of the operation of the disc brake system.

It is a further object of this invention to alleviate the problem of radial run out in a speed sensing device comprising an exciter ring and a magnetic pick up device.

These and other objects of this invention, which will become evident from the description of the invention which follows, are achieved by a disc adapter with a substantially flat, radially extending annular flange having a radially extending surface which forms an exciter ring, the flange being a unitary part of the disc adapter. Adjacent to the exciter ring of the disc adapter is at least one coaxial brake disc, the brake disc also being a unitary part of the disc adapter. The disc adapter has means to facilitate a coaxial mounting to a rotating portion of a wheel. The exciter ring portion of the disc adapter comprises a predetermined number, preferably of equally and annularly spaced, radially extending surface variations such as ripples or teeth. A magnetic pickup device of an anti-skid system is spaced axially from the exciter ring for operative cooperation therewith.

DESCRIPTION OF A PRESENTLY PREFERRED EMBODIMENT

Figure 1:
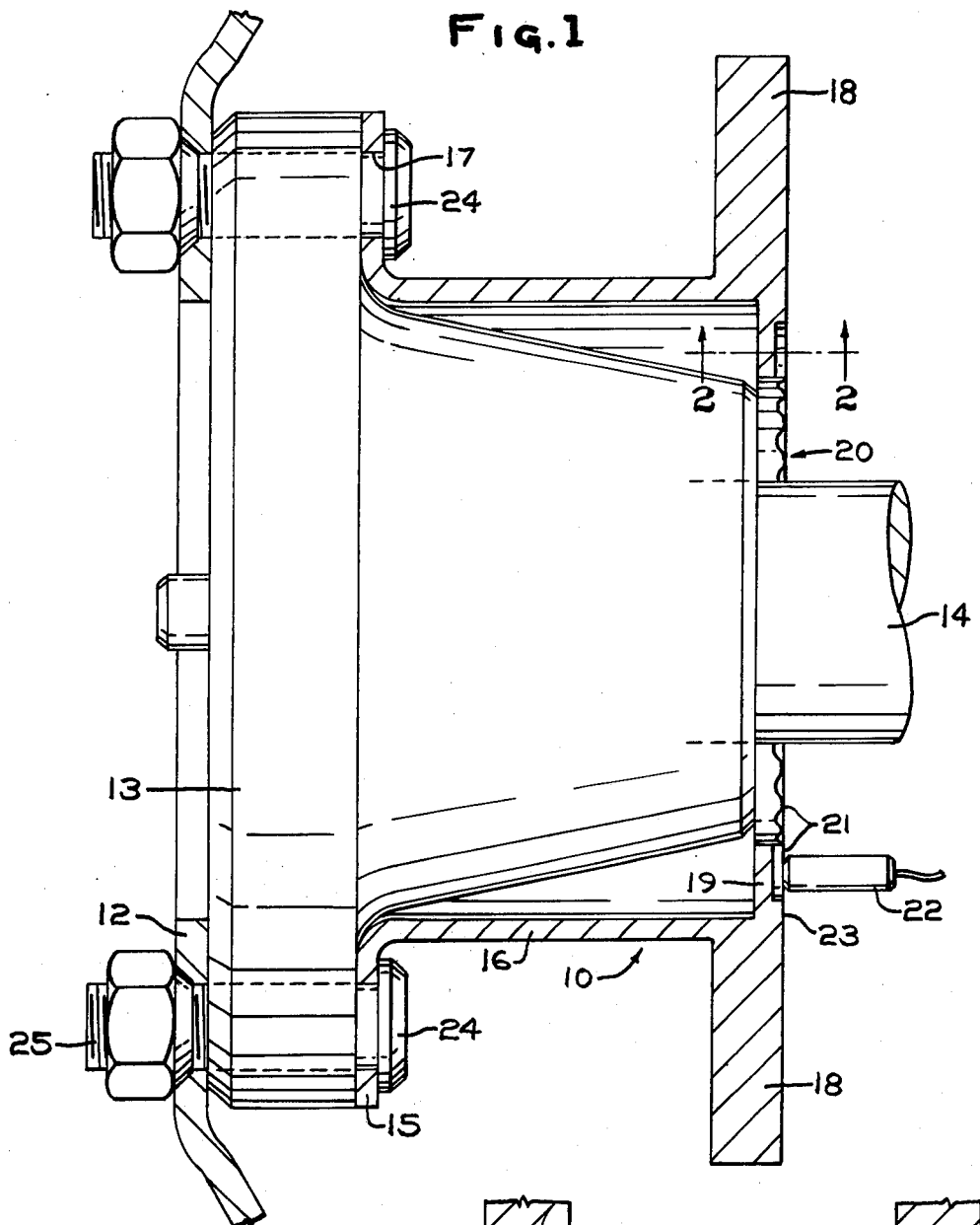
FIG. 1 is a longitudinal section view of a wheel brake portion having a disc adapter of the present invention.

In FIG. 1 a portion 12 of a typical wheel is shown mounted on a hub 13 which is attached to an axle 14. The wheel is equipped with a disc brake assembly which includes a rotor 18 and a typical stator (not shown). The rotor 18 is rigidly attached to the wheel 12 by means of a brake disc adapter 10. To simplify manufacturing and mounting procedures, it is preferred that the disc adapter 10 and rotor 18 are a unitary structure, as shown, but alternatively the adapter 10 may be structurally separate and affixed to the rotor 18 by any suitable manner such as a weld. The disc adapter 10 is secured to wheel portion 12 by suitable fastening means such as bolts 24. The threaded portion 25 of the bolts 24 may also form mounting studs for the wheel. The bolts 24 permit the rotating wheel to transmit rotational movement to the disc adapter 10 and the rotor 18 at the same rotational velocity.

Figure 2:
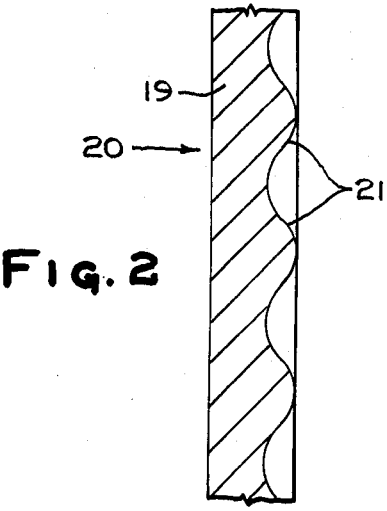
FIG. 2 is a sectional view of a portion of the disc adapter taken along line 2—2 of FIG. 1 according to one embodiment of the invention; and, FIG. 3 is a sectional view similar to FIG. 2 showing a portion of a disc adapter according to another embodiment of the present invention.
Figure 3:
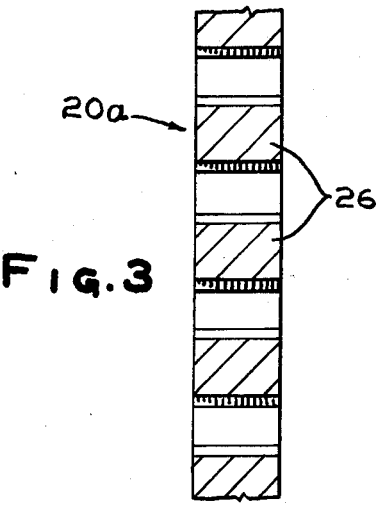

A preferred embodiment of the disc adapter 10 includes an axially extending annular portion 16 and a radially outwardly extending annular portion 15, both portions 16 and 15 being co-axial with the rotational axis of the wheel. The disc adapter 10 extends axially outwardly (leftwardly in FIG. 1) from the rotor 18 to the wheel 12. Radially annular portion 15 contains bolt holes 17 for mounting of the disc adapter 10 to the wheel by bolts 24. The disc adapter 10 further comprises a radially inwardly extending annular flange 19 with a substantially flat radially extending annular surface 23, forming an exciter ring 20 which is also co-axial with rotational axis of the wheel. The surface 23 faces axially inwardly (rightwardly in FIG. 1) of the wheel 12. The exciter ring 20 is disposed adjacent to and extending in the opposite radial direction from the rotor 18 for convenient disposition adjacent a pickup device 22 which is spaced axially inwardly from the exciter ring on surface 23. From a manufacturing standpoint, it is preferred that the exciter ring 20 is a unitary part of the disc adapter 10. Alternatively, it is understood that the exciter ring can be a distinct annular ring fastened to the disc adapter 10 by suitable means, such as welding. The exciter ring 20 contains a plurality of equally and annularly spaced surface variations, such as the radially extending ripples 21 as can be seen more clearly in FIG. 2. Alternatively, the exciter ring may contain teeth 26 as seen on exciter ring 20a in FIG. 3.

A typical sensor or magnetic pickup device 22 for a brake anti-skid system is shown stationarily situated axially inwardly of and for operative cooperation with the exciter ring 20 or 20a. the pickup device 22 may be a conventional "bi-polar" or "uni-polar" type pickup device. A uni-polar type pickup device can be used with an exciter ring 20 having ripples such as 21 with ring 20a having teeth such as 26. A bi-polar type pickup can be used only with an exciter ring 20 having teeth such as 26.

Sensors generating sixty pulses per wheel revolution have become somewhat of an industry standard in presently available anti-skid systems. This, for optimum operating the exciter ring should contain sixty surface variations such as ripples 21 or teeth 26. Exciter rings having between about 54 and about 66 surface variations are also considered operable within this industry standard. It is understood that notwithstanding this industry standard exciter rings having any predetermined number of surface variations are considered within the scope of this invention.

The modulating valve of an anti-skid system is located in the brake line. Prior to activation by the logic circuit, the modulating valve permits an operator to apply braking force to a wheel at any pressure. During braking, the rotor 18 is contacted by a stator (not shown). The rotor thus slows down the wheel 12 and the exciter ring 20 by means of the disc adapter 10. The pickup device 22 constantly sends pulses to the logic circuit, one pulse for every ripple or tooth of the exciter ring that passes the pickup device. As the rotor 18 and stator engage, the rotor and exciter ring 10 decelerate. The logic circuit receives pulses at a lower frequency and determines when a skid situation is impending, i.e. when the wheel 12 starts to decelerate too rapidly. When the logic circuit determines an impending skid situation, it signals the modulating valve to release enough of the braking pressure to avoid the skid. The logic circuit determines from the sensor data when the wheel 12 has accelerated to its proper braking deceleration rate and signals the modulating valve to gradually increase braking pressure.

Although the foregoing structure was described for the purpose of illustrating a presently preferred embodiment of the invention, it should be understood that many modifications or alterations may be made without departing from the spirit and the scope of the invention as set forth in the appended claims.

I claim:

1. In a wheel and disc brake assembly having at least one substantially radially extending rotatable brake disc and a disc adapter connected to and extending axially outwardly from the rotatable brake disc to a rotatable portion of the wheel, the improvement wherein the disc adapter further comprises a substantially radially extending annular flange having a substantially flat radially extending annular surface facing axially inwardly of the wheel, the surface comprising an exciter ring portion having a plurality of equally and annularly spaced, radially extending surface variations, said exciter ring portion being adapted to be operatively situated adjacent to a magnetic pickup device spaced axially inwardly from the surface, said pickup device being a component of a skid control system.

2. The assembly defined in claim 1 wherein the surface variations comprise teeth.

3. The assembly defined in claim 1 wherein the surface variations comprise ripples.